(12) United States Patent
Viloria et al.

(10) Patent No.: US 8,641,922 B2
(45) Date of Patent: Feb. 4, 2014

(54) REGENERABLE AND NON-REGENERABLE SORBENTS FOR ACID GAS REMOVAL

(75) Inventors: Alfredo Viloria, Caracas (VE); Rafael Yoll, San Antonio de Los Altos (VE); Yanine Gonzalez, Los Teques (VE); Monica Roman, Caracas (VE); Jose Biomorgi, San Antonio de Los Altos (VE)

(73) Assignee: Intevep, S.A., Caracas (VE)

(*) Notice: Subject to any disclaimer, the term of this patent is extended or adjusted under 35 U.S.C. 154(b) by 0 days.

(21) Appl. No.: 13/269,394

(22) Filed: Oct. 7, 2011

(65) Prior Publication Data

US 2012/0025135 A1    Feb. 2, 2012

Related U.S. Application Data

(62) Division of application No. 12/347,724, filed on Dec. 31, 2008, now Pat. No. 8,110,094.

(51) Int. Cl.
*C09K 3/00* (2006.01)
*B01D 53/14* (2006.01)

(52) U.S. Cl.
USPC ........... 252/184; 252/189; 252/190; 423/228; 423/229; 423/242.3; 423/242.4; 423/242.5; 423/242.7

(58) Field of Classification Search
USPC .............. 252/184, 189, 190; 423/228, 229, 423/242.3, 242.4, 242.5, 242.7
See application file for complete search history.

(56) References Cited

U.S. PATENT DOCUMENTS

| 1,756,191 | A | * | 4/1930 | Guillissen | 201/20 |
| 1,772,078 | A | * | 8/1930 | Guillissen | 423/358 |
| 1,973,529 | A | | 9/1934 | Guinot | |
| 3,681,015 | A | | 8/1972 | Gelbein et al. | |
| 3,968,739 | A | | 7/1976 | Stoltenburg | |
| 3,969,537 | A | * | 7/1976 | Stoltenburg | 426/464 |
| 4,100,257 | A | | 7/1978 | Sartori et al. | |
| 4,337,123 | A | * | 6/1982 | De Sa et al. | 203/19 |
| 4,483,833 | A | | 11/1984 | Stogryn et al. | |
| 4,976,935 | A | | 12/1990 | Lynn | |
| 5,250,089 | A | | 10/1993 | Delzer et al. | |
| 5,760,078 | A | | 6/1998 | Hamstra et al. | |
| 5,851,405 | A | | 12/1998 | Paananen et al. | |
| 6,022,394 | A | * | 2/2000 | Paananen et al. | 71/26 |
| 6,143,176 | A | | 11/2000 | Nagamatsu et al. | |
| 7,138,257 | B2 | | 11/2006 | Galli | |
| 7,332,145 | B2 | | 2/2008 | Chretien | |
| 7,388,120 | B2 | | 6/2008 | van Egmond | |
| 7,507,562 | B2 | | 3/2009 | Verser | |
| 8,110,094 | B2 | * | 2/2012 | Viloria et al. | 208/310 Z |
| 2005/0019932 | A1 | * | 1/2005 | Dale et al. | 435/483 |
| 2005/0266539 | A1 | * | 12/2005 | Hochberg et al. | 435/161 |

FOREIGN PATENT DOCUMENTS

EP    1626092    2/2006
FR    2609046    7/1988

* cited by examiner

*Primary Examiner* — Joseph D Anthony
(74) *Attorney, Agent, or Firm* — Bachman & LaPointe, P.C.

(57) ABSTRACT

A sorbent for removal of acid gas from hydrocarbon gas includes a mixture of dewatered residue obtained from the distillation of ethanol, and an amine.

19 Claims, 6 Drawing Sheets

Regenerable Sorbent
H2S Absorption Capacity

REGENERABLE AND NON-REGENERABLE SORBENTS FOR ACID GAS REMOVAL

CROSS-REFERENCE TO RELATED APPLICATIONS

This is the U.S. divisional patent application of U.S. patent application Ser. No. 12/347,724 filed Dec. 31, 2008.

BACKGROUND OF THE INVENTION

This disclosure relates to a formulation of regenerable and non-regenerable sorbents and a process using these sorbents for the removal of acid gases, more particularly, for the removal of H2S and CO2 from hydrocarbon gas through the application of a mixture of an ethanol distillation residue and an amine.

In the treatment and processing of natural gas, the removal of acid gases, such as hydrogen sulfide (H2S) and carbon dioxide (CO2), is of great importance for the distribution of natural gas energy to the market.

Due to their corrosive properties the presence of acid gases, such as hydrogen sulfide (H2S) and carbon dioxide (CO2), in natural gas fluid streams is undesirable. The acid gases are dissolved in the water that is present in the natural gas causing contamination of the natural gas and reducing the calorific value of the natural gas. As a result, there are numerous procedures available for the removal of acid gases. Those which are most commonly used in industry include solid beds, chemical solvents and liquid sorbents.

SUMMARY OF THE DISCLOSURE

The present disclosure details a regenerable and non-regenerable sorbent for the removal of acid gas from hydrocarbon gas streams. The regenerable sorbent comprises a mixture of de-watered residue obtained from the production of ethanol, an activator and an inhibitor, wherein the activator is the primary material in the sorbent. The non-regenerable sorbent comprises a mixture of de-watered residue from the production of ethanol, an activator, an inhibitor and an antifoam agent, wherein the de-watered residue is the activator in the sorbent.

The present disclosure further details a process for the removal of acid gas from hydrocarbon gas streams. The process begins with the de-watering of residue produced from the production of ethanol. The de-watered residue may then be mixed with an activator, an inhibitor and possibly an antifoam agent. The sorbent is then contacted with the hydrocarbon gas stream.

BRIEF DESCRIPTION OF THE DRAWINGS

A detailed description of preferred embodiments of the present disclosure follows, with reference to attached drawings, wherein.

DETAILED DESCRIPTION

Figure 1:
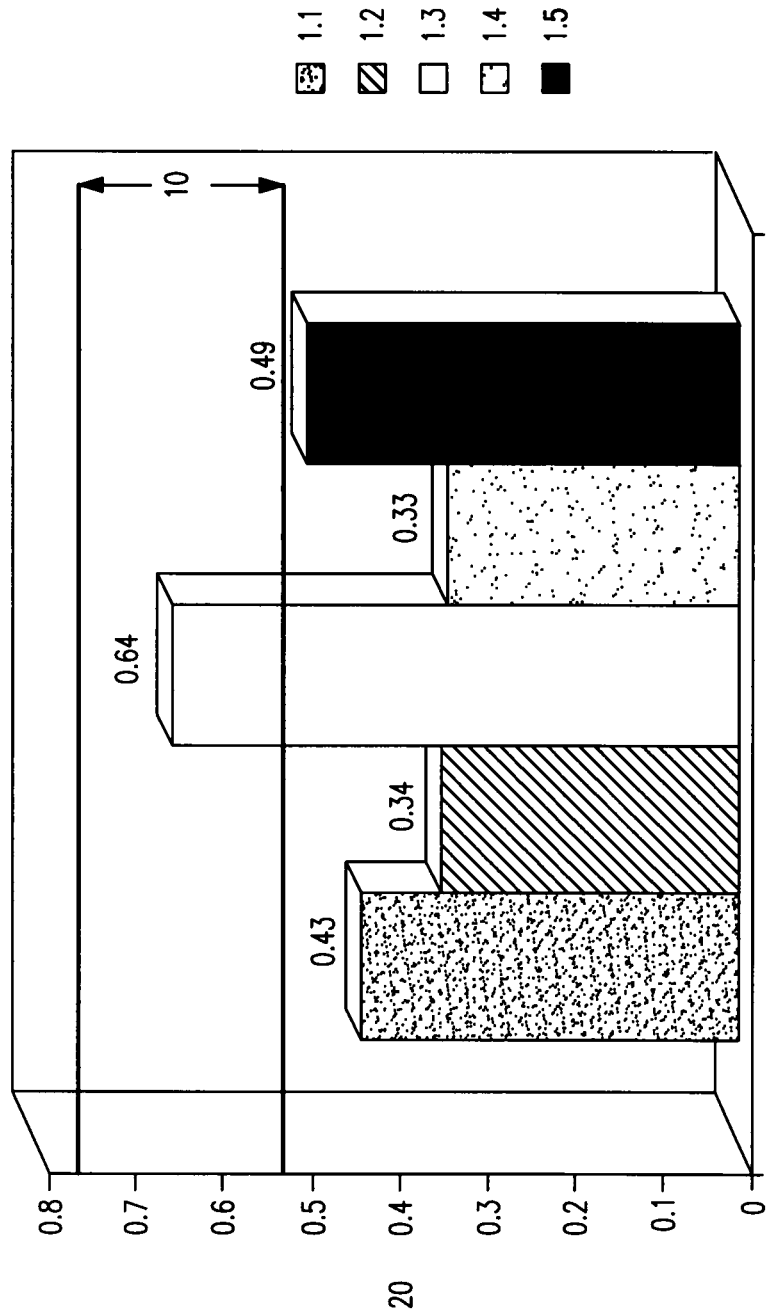
FIG. 1 graphically depicts the H2S absorption capacity of the non-regenerable sorbent.

The disclosure relates to the process of formulation and application of regenerable and non-regenerable sorbents for the removal of acid gases, such as hydrogen sulfide (H2S), carbon dioxide (CO2), sulfur dioxide (SO2), carbon disulfide (CS2), hydrogen cyanide (HCN) and carbon oxide sulfide (COS), from hydrocarbon gas. The sorbent may comprise a residue obtained from the distillation of ethanol, an activator, such as an amine or the distilled residue, an inhibitor and an antifoam agent. The hydrocarbon gas may be any gas production stream, such as natural gas, synthesis gas from heavy oil, synthesis gas from heavy residues, refinery gas and liquefied gas.

In the ethanol distillation process a liquid residue is produced. This liquid residue is called vinasse. Vinasse may be obtained from any distillation process employed for the production of ethanol. The ethanol may be produced from any fruit, vegetable or mixtures thereof, such as cane sugar, beet root, wheat, corn and mixtures thereof.

The distillation process of ethanol produces an average of 10-14 liters of vinasse per liter of ethanol with a concentration of 96% v/v per liter of ethanol. To prepare soluble molasses condensate, the vinasse, which contains 10% solids, is concentrated by mechanical compression to form a product resulting in about at least 65% solids. After concentration, de-watered vinasse, i.e. vinasse with a solids content of about 65%, or soluble molasses condensate (SMC) is formed.

TABLE 1

Composition of Vinasse and SMC

| Parameters | Vinasse | SMC |
|---|---|---|
| *Elementary analysis | C: 4.43%; H: 10.13; N: 0.18% | C: 18.06%; H: 10.92%; N: 1.52% |
| *Total solids | 11.63% | 65% |
| *Water | 75% | 42% |
| *pH | 4.5 | 4.5 |
| *Ca | As the oxide: 0.22% | 0.75% |
| *K | As the oxide: 1.01% | 5.80% |
| *Mg | As the oxide: 0.1% | 0.60% |
| *P | As the anhydride: 0.04% | 0.13% |
| **Total acidity | 5.70% | 28.02% |
| **Volatile acidity | 3.71% | 25.02% |
| **Fixed acidity | 1.99% | 3.00% |
| **Dissolved solids | 54.64% | 4.62% |
| **Solids in suspension | 10.00% | 6.00% |
| **Density | 1.2411 g/ml | 1.106 g/ml |
| **Conductivity | 24.6 mS/cm | 23.5 mS/cm |
| *Proteins | — | 8.85% |
| *Ash | — | 14.6% |
| *Crude fat | — | 0.42% |
| *Cellulose | — | 0.02% |
| *Viscosity (20° C., 50 rpm) | — | 340 (A.D.I.M) |
| *Specific gravity at 20° C. | — | 1.325 g/l |

*Source: Analysis performed by the Ron Santa Teresa Distillery, Aragua State, Venezuela, in 2006.
**Source: M. Román, Y. González and A. Viloria, 2007, Vinasse, a by-product of ethanol distillation, technical report, Intevep, Los Teques, Venezuela, Technical Document No. SEA-0019, 2007.

Table 1 lists the chemical compositions of both vinasse and SMC. As illustrated in Table 1, SMC contains sugars, esters, lactones, salts, trace elements, inorganic compounds, carboxylic acids and nitrogen compounds. The chemical composition of the SMC can vary with factors such as the weather, the climate, variations in soil and the age of the plant. It has been found that SMC's active substances, such as carboxylic acids and nitrogen compounds, are not affected by the varying factors above and exhibit regenerable liquid sorbent and non-regenerable liquid sorbent tendencies for the removal of acid gases from streams of natural gas and liquefied petroleum.

SMC has a high acid gas absorption capacity; however, it is very corrosive. The corrosive nature of SMC may be alleviated by combining the SMC with an activator such as an amine. Amines used in the sorbents include 1,3,5-tri-(2-hydroxyethyl)-hexahydro-triazine, i.e. triazine, and formulated amine solvents.

The formulated amine solvents consist of primary alkanolamines, secondary alkanolamines, tertiary alkanolamines and mixtures thereof. Formulated amines may contain commercial amines such as monoethanolamine (MEA), diethanolamine (DEA), methyldiethanolamine (MDEA), diglycolamine (DGA), methyldiglycolamine (MDGA), diisopropanolamine (DIPA) and piperazine.

The SMC/activator combination is dependent upon its use. In one use, the SMC/activator formulation is combined to obtain a pH range of from about 4.5 to about 14. A non-regenerable sorbent can be useful, for example, for decentralized use. In order to form this type of sorbent, the SMC is the activator present in excess of the amine. A non-regenerable SMC/amine system formed with an excess of SMC as compared to the amine may be formed using SMC at a concentration of about 20% v/v to about 90% v/v and amine at a concentration of about 10% v/v to about 80% v/v.

To form a regenerable sorbent for centralized use, the amine is the activator present in excess of the SMC. A regenerable amine/SMC system is formed which uses an excess of amine as compared to the SMC, with the amine at a concentration of about 80% v/v to about 90% v/v and the SMC at a concentration of about 1% v/v to about 20% v/v.

One application for the non-regenerable SMC/amine system is direct injection into gas transmission and transport lines. The SMC/amine system may be used for decentralized use, such as continuous direct injection. The injection can be performed with the aid of an injection pump, means of introducing the sorbent into the natural gas pipeline, tubing that permits mixing, and a device for separating settled liquid.

For the application of non regenerable liquid scavengers, the SMC/amine system may be used in natural gas streams with a flow rate of about 40 million to about 60 million cubic feet of natural gas per day with a H2S content of less than 100 ppm (parts-per-million).

FIG. 1 graphically depicts the H2S absorption of a non-regenerable SMC/amine formulation. y-axis 20 represents the absorption capacity of H2S in pounds (lbs) of H2S per gallon of sorbent. 10 represents the H2S absorption efficiency range obtained through the testing of various commercial sorbents.

In FIG. 1, the SMC is used in excess of the amine and the amine is MEA, DEA and/or MDEA. FIG. 1 shows that SMC/amine formulations 1.3 SMC/MEA and 1.5 SMC/MDEA have a greater absorption capacity than unformulated raw vinasse 1.2 and raw SMC 1.1. The SMC/DEA 1.4 shows a similar absorption capacity, 0.33 lb H2S per gallon of sorbent, as exhibited by raw vinasse, 0.34 lb H2S per gallon of sorbent. The SMC/MEA 1.3 had the highest absorption capacity of 0.64 lb H2S per gallon of sorbent. For this formulation prepared with conventional amines as agents promoting the capture of H2S, the reactivity decreased along the series MEA>MDEA>DEA according to whether the amine was primary, tertiary or secondary.

Figure 2:
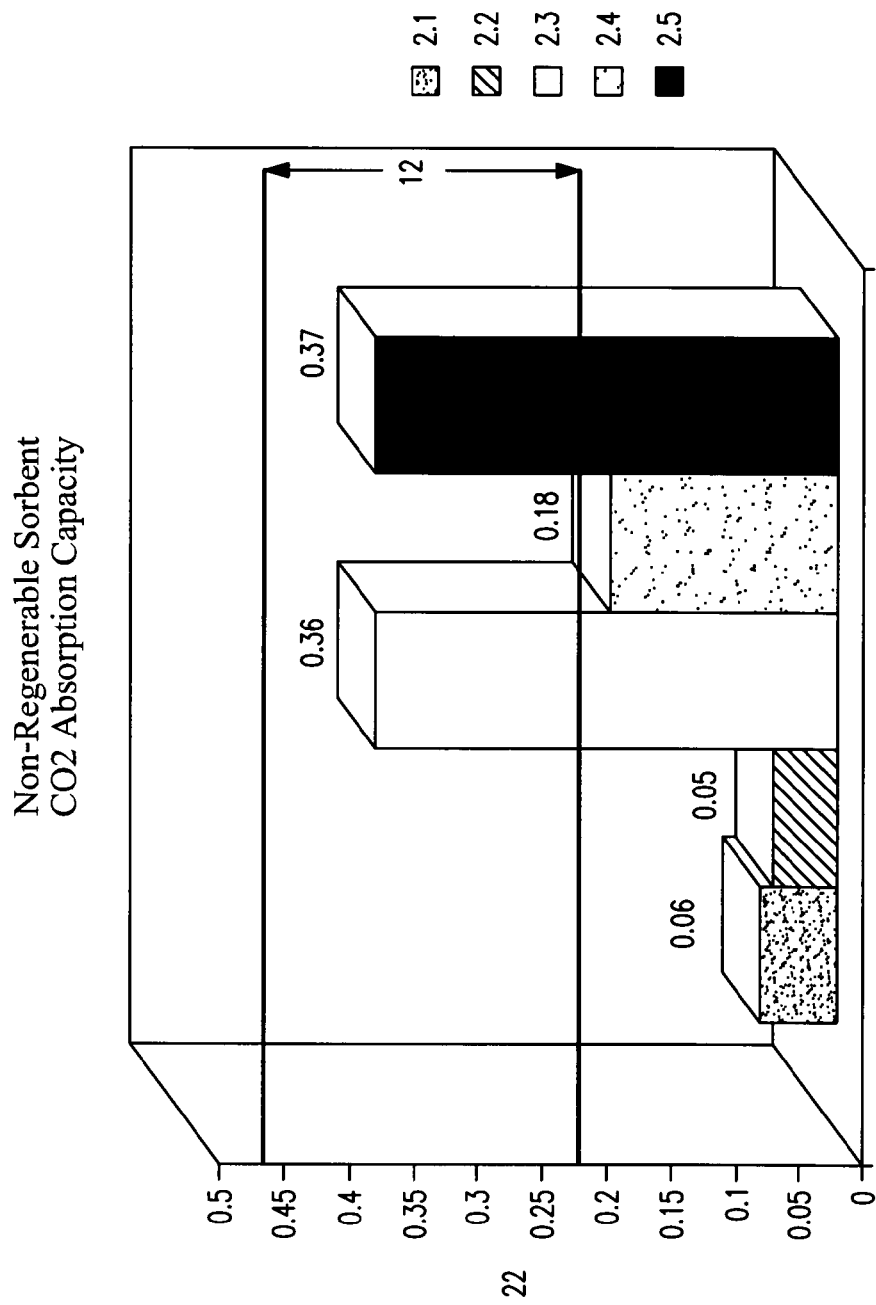
FIG. 2 graphically depicts the CO2 absorption capacity of the non-regenerable sorbent.

FIG. 2 graphically depicts the CO2 absorption of a non-regenerable SMC/amine formulation. y-axis 22 represents the absorption capacity of CO2 in pounds (lbs) of CO2 per gallon of sorbent. 12 represents the CO2 absorption efficiency range obtained through the testing of various commercial sorbents.

In FIG. 2, the SMC is used in excess of the amine and the amine is MEA, DEA and/or MDEA. FIG. 2 shows that SMC/amine formulations 2.3 SMC/MEA and 2.5 SMC/MDEA have a greater absorption capacity than unformulated raw vinasse 2.2 and raw SMC 2.1. The SMC/DEA 2.4 shows a low absorption capacity, 0.18 lb CO2 per gallon of sorbent. The SMC/MDEA 2.5 had the highest absorption capacity of 0.37 lb CO2 per gallon of sorbent. Both the commercial triazines and the amines tested showed a low reactivity toward CO2.

To reduce corrosion an inhibitor may be added to the SMC/amine formulation. Table 2 shows the effect of deterioration of installations containing SMC/amine formulations.

TABLE 2

| Formulation | Dose of solution in the line | Concentration of inhibitor ($C_i \pm 5$), ppm | Rate of corrosion in mpy($v \pm 0.1$) | Atmosphere used for the test |
| --- | --- | --- | --- | --- |
| SMC/MEA | 1% | 0 | 6.4 | $H_2S$ |
| | | 50 | 6.9 | |
| | 5% | 0 | 19.3 | |
| | | 50 | 27 | |
| | 10% | 0 | 17 | |
| | | 50 | 12.8 | |

Loss of weight tests were performed in Table 2. The rate of corrosion was determined while increasing the concentration of the SMC/amine formulation in the line. Table 2 shows that an increase in the concentration of the SMC/amine formulation has a direct effect on the rate of corrosion. Inhibitors, such as filmic inhibitor, amine-amide, imidazolines, quaternary salts of ammonium and mixtures thereof, may be added in the concentration range of about 10 ppm to about 500 ppm in order to maintain a corrosion rate of about 7 mpy (mils per year).

Table 2 illustrates that the variation in efficiency of corrosion inhibitors is related to the velocity of corrosion. This variation can be associated with the types of chemical interactions and electrostatic interactions present in the formulation. The interactions may be directly related to the concentration of the inhibitor used. The interactions and type of inhibitor used may or may not promote colloidal surfactant aggregates such as micelles.

Inhibitor efficiency reaches a peak or maximum when micelles are formed in the solution. This point of inhibitor efficiency is called critical micellar concentration (CMC). Table 2 illustrates the change in the velocity of the corrosion of the formulation in relation to the concentration of the inhibitor as it reaches the critical micellar concentration.

The regenerable amine/SMC system may be applied by batch application in contact towers, absorption columns or the like. The amine/SMC system may be used for centralized use, such as placing a certain amount or dose of the amine/SMC formulation on a contact tower to retain the acid gas that is present in the gas stream that is continuously flowing through the equipment. The acid gas is retained until the temperature of the formulation is increased and/or the pressure is reduced. The increase in temperature and/or reduction in pressure allow the acid components of the acid gas to be separated off.

In the amine/SMC system for centralized use the SMC may be combined with commercial amines, such as MEA, DEA and MDEA. The commercial amines used in the preparation of the amine/SMC formulation may be applied in the optimum concentrations as recommended by Campbell. These concentrations are about 15% MEA, about 30% DEA, and about 50% MDEA. John M. Campbell, "Gas conditioning and processing: Gas treating and sulfur recovery," Vol. 4 (4th ed. 2006).

The amine/SMC system may be used in natural gas streams with a concentration equal to or greater than 100 ppm of H2S in volumes of gas greater than 125 million cubic feet.

Figure 3:
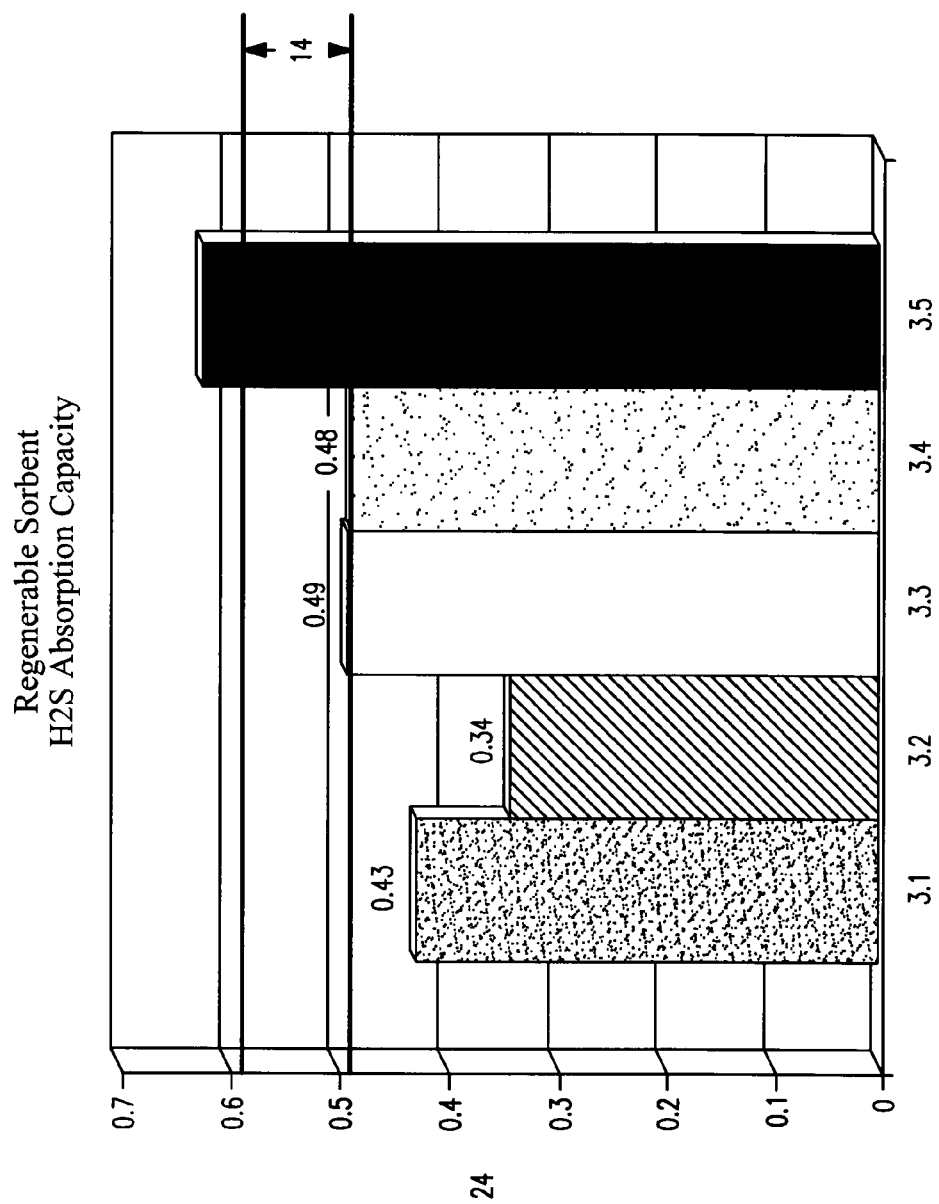
FIG. 3 graphically depicts the H2S absorption capacity of the regenerable sorbent.

FIG. 3 graphically depicts the H2S absorption of a regenerable amine/SMC formulation. y-axis 24 represents the absorption capacity of H2S in pounds (lbs) of H2S per gallon of sorbent. 14 represents the H2S absorption efficiency range obtained through the testing of various commercial sorbents after dilution to the recommended best concentrations.

In FIG. 3, the amine is used in excess of the SMC. FIG. 3 shows that amine/SMC formulations have a greater absorption capacity than unformulated raw vinasse 3.2 and raw SMC 3.1. The MEA/SMC 3.3 and DEA/SMC 3.4 show a similar absorption capacity, about 0.48 lb H2S per gallon of sorbent, as exhibited by the low end of the efficiency range of commercial sorbents. The MDEA/SMC 3.5 had the highest absorption capacity of 0.62 lb H2S per gallon of sorbent. For this formulation prepared by using SMC as the agent promoting the capture of H2S, the reactivity decreased along the series MDEA>MEA>DEA according to whether the amine was primary, tertiary or secondary.

Figure 4:
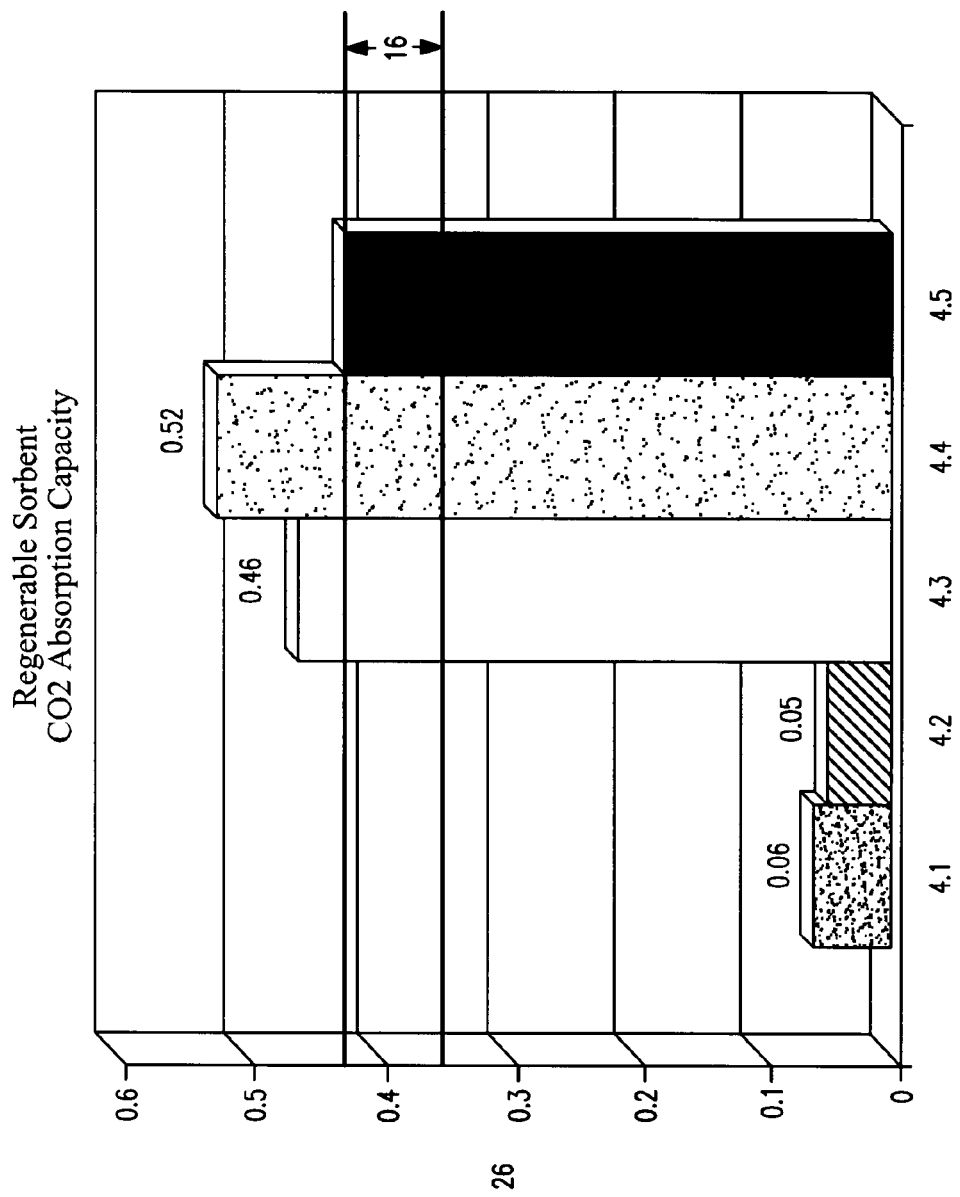
FIG. 4 graphically depicts the CO2 absorption capacity of the regenerable sorbent.

FIG. 4 graphically depicts the CO2 absorption of a regenerable amine/SMC formulation. y-axis 26 represents the absorption capacity of CO2 in pounds (lbs) of CO2 per gallon of sorbent. 16 represents the CO2 absorption efficiency range obtained through the testing of various commercial sorbents.

In FIG. 4, the amine is used in excess of the SMC. FIG. 4 shows that amine/SMC formulations 4.3 MEA/SMC, 4.4 DEA/SMC and 4.5 MDEA/SMC have a much greater absorption capacity than unformulated raw vinasse 4.2 and raw SMC 4.1. The DEA/SMC 4.4 had the highest absorption capacity of 0.52 lb CO2 per gallon of sorbent. Since all three amine/SMC formulations showed increased CO2 absorptions, it can be concluded that the SMC is sufficient as a promoter increasing the amine absorption.

To reduce corrosion an inhibitor may be added to the amine/SMC formulation. Table 3 shows the effect of deterioration of installations containing amine/SMC formulations.

TABLE 3

| Formulation | Concentration of inhibitor ($C_i$ ± 5), ppm | Corrosion rate in mpy(v ± 0.1) | Atmosphere used for the test |
|---|---|---|---|
| MDEA/SMC | 0 | 0.9 | $H_2S$ |
| DEA/SMC | 0 | 29.5 | $CO_2$ |
|  | 100 | 15.7 |  |
|  | 200 | 12.9 |  |

Loss of weight tests were carried out in Table 3. Table 3 shows that the corrosion rate in the case of the MDEA/SMC formulation does not require an inhibitor in the presence of H2S. However, the DEA/SMC formulation evaluated in an atmosphere of CO2 requires corrosion inhibitors. About 200 ppm of inhibitor will reduce the corrosion rate of the DEA/SMC formulation from about 29 mpy (mils per year) to about 13 mpy.

Both formations, the SMC/amine formulation and the amine/SMC formulation may contain additional additives, such as antifoam agents and corrosion inhibitors. Antifoam agents such as, silanes, polyalcohols, silicones, fluorosilicones, polymethylsiloxanes, aloe vera and mixtures thereof, may be added to the formulations in the concentration range of about 10 ppm to about 500 ppm. Corrosion inhibitors, such as filmic inhibitor, amine-amide, imidazolines, quaternary ammonium salts and mixtures thereof, may also be added to the formulations in the concentration range of about 10 ppm to about 500 ppm.

Figure 5:
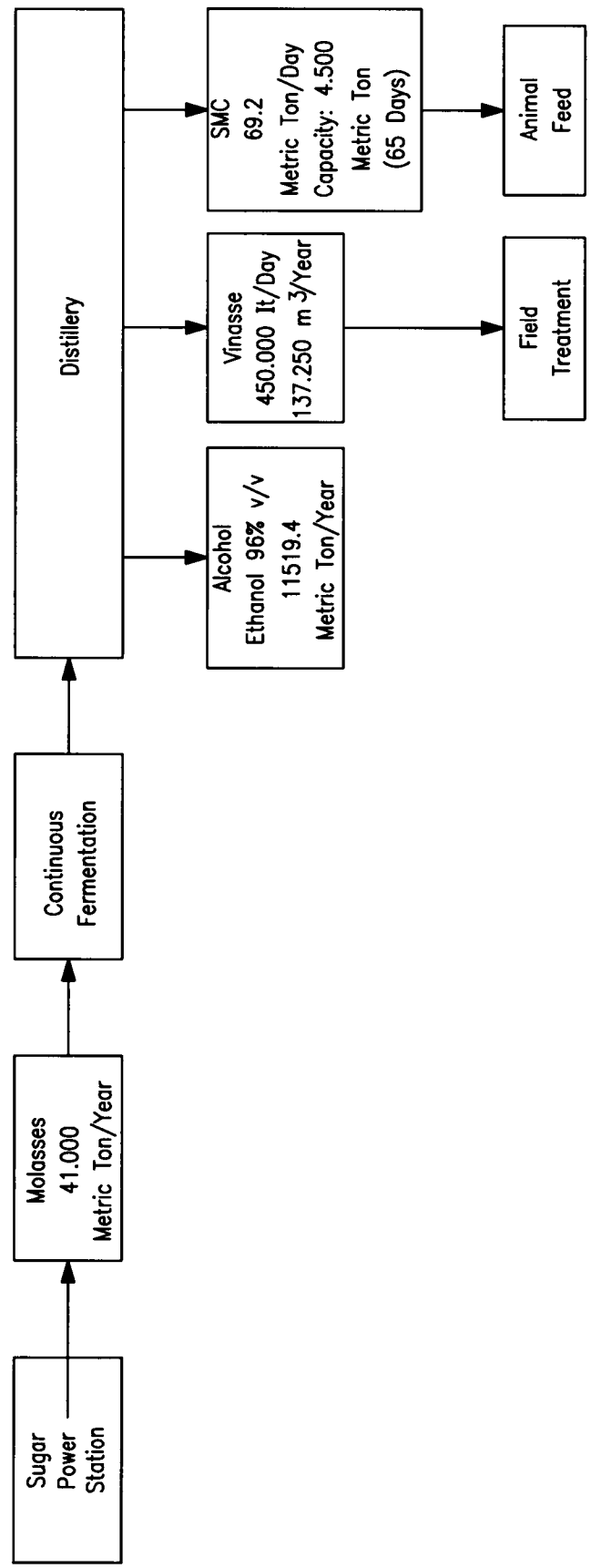
FIG. 5 schematically depicts the ethanol distillation process.
Figure 6:
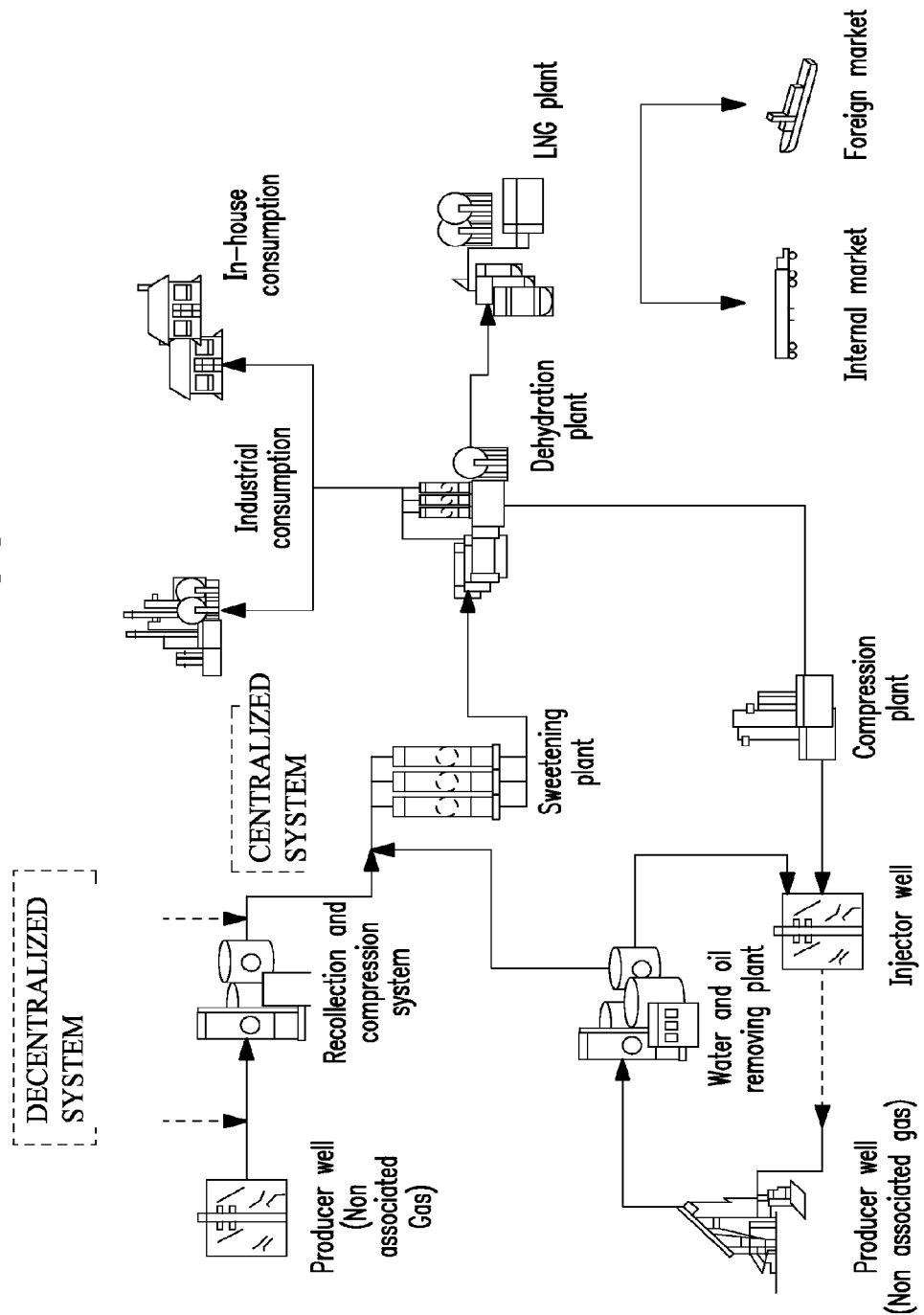
FIG. 6 schematically depicts the inventive decentralized and centralized systems of the present invention.

The regenerable and non-regenerable liquid sorbents described in this specification have several advantages over the presently available commercial sorbents. The regenerable and non-regenerable liquid sorbents of this specification use a distillation residue as a major component in the sorbent. By producing a chemical product from the distillation residue of ethanol, value is added to the ethanol production process. In addition, the use of a distillation residue, i.e. distillation waste product, in the sorbent leads to a low production cost. FIG. 5 details a sugar cane distillation.

Example 1

The SMC/amine mixture is added with the SMC in excess of the amine. The SMC/amine formation mixture may contain about 40% SMC and about 12% amine. The SMC/MEA formulation may have a concentration of about 150 ml SMC to about 5 ml MEA. The SMC/DEA formulation may have a concentration of about 130 ml SMC to about 5 ml DEA. The SMC/MDEA formulation may have a concentration of about 200 ml SMC to about 10 ml MDEA. The remaining non limiting composition constituents may include sorbent additives that are well known within the art, such as inhibitors, antifoam agents and water. The pH of the SMC/amine formulations are neutral, i.e. about a pH of 7.

Example 2

The amine/SMC mixture is added with the amine in excess of the SMC. The MEA/SMC formulation may have a concentration of about 15% MEA to about 5% SMC. The DEA/SMC formulation may have a concentration of about 30% DEA to about 5% SMC. The MDEA/SMC formulation may have a concentration of about 50% MDEA to about 5% SMC. The remaining non limiting composition constituents may include sorbent additives that are well known within the art, such as inhibitors, antifoam agents and water. The pH of the amine/SMC formulations are basic, i.e. about a pH of 11.

It is to be understood that the present specification is not limited to the illustrations described and shown herein, which are deemed to be merely illustrative of the best modes of carrying out the present specification and which are susceptible of modification of form, size, arrangement of parts and details of operation. The present specification, i.e. the invention, rather is intended to encompass all such modifications which are within its spirit and scope as defined by the claims.

What is claimed is:

1. A sorbent for removal of acid gas from hydrocarbon gas comprising a mixture of a dewatered vinasse obtained from distillation of ethanol, and an amine.

2. The sorbent of claim 1, wherein the ethanol is produced from a material selected from the group consisting of cane sugar, beet root, corn and mixtures thereof.

3. The sorbent of claim 1, wherein the dewatered vinasse further comprises carboxylic acids, sugars, esters, lactones, salts and nitrogen compounds.

4. The sorbent of claim 1, wherein the dewatered vinasse has a solids content of at least about 65%.

5. The sorbent of claim 1, wherein the sorbent is used in a decentralized system.

6. The sorbent of claim 5, wherein the amine is an activator.

7. The sorbent of claim 5, wherein the sorbent is non-regenerable.

8. The sorbent of claim 5, wherein the concentration of the dewatered vinasse is between about 20% v/v and about 90% v/v, and wherein the concentration of the amine is between about 10% v/v and about 80% v/v.

9. The sorbent of claim 1, wherein the sorbent is used in a centralized system.

10. The sorbent of claim 9, wherein the dewatered vinasse is an activator.

11. The sorbent of claim 9, wherein the sorbent is regenerable.

12. The sorbent of claim 9, wherein the concentration of the dewatered vinasse is between about 1% v/v and about 20% v/v, and wherein the concentration of the amine is between about 80% v/v and about 99% v/v.

13. The sorbent of claim 1, wherein the amine is selected from the group consisting of primary alkanolamines, secondary alkanolamines, tertiary alkanolamines and mixtures thereof.

14. The sorbent of claim 13, wherein the amine is selected from the group consisting of monoethanolamine, diethanolamine, diglycolamine, methyldiglycolamine, diisopropanolamine, methyldiethanolamine, piperazine and combinations thereof.

15. The sorbent of claim 1, wherein the sorbent has a pH of between about 4.5 to and about 14.

16. The sorbent of claim 1, further comprising a corrosion inhibitor at a concentration of between about 10 ppm and about 500 ppm.

17. The sorbent of claim 16, wherein the corrosion inhibitor is selected from the group consisting of filmic inhibitor, amine-amide, imidazoline, quaternary salts of ammonium and mixtures thereof.

18. The sorbent of claim 1, further comprising an antifoaming agent at a concentration of between about 10 ppm and about 500 ppm.

19. The sorbent of claim 18, wherein the antifoaming agent is selected from the group consisting of silicones, silanes, polyalcohols, fluorosilicones, polymethylsiloxanes, aloe vera and mixtures thereof.

* * * * *